July 21, 1953     C. W. MAXWELL     2,646,181
BALE LOADING ATTACHMENT FOR VEHICLES
Filed July 7, 1950     2 Sheets-Sheet 1
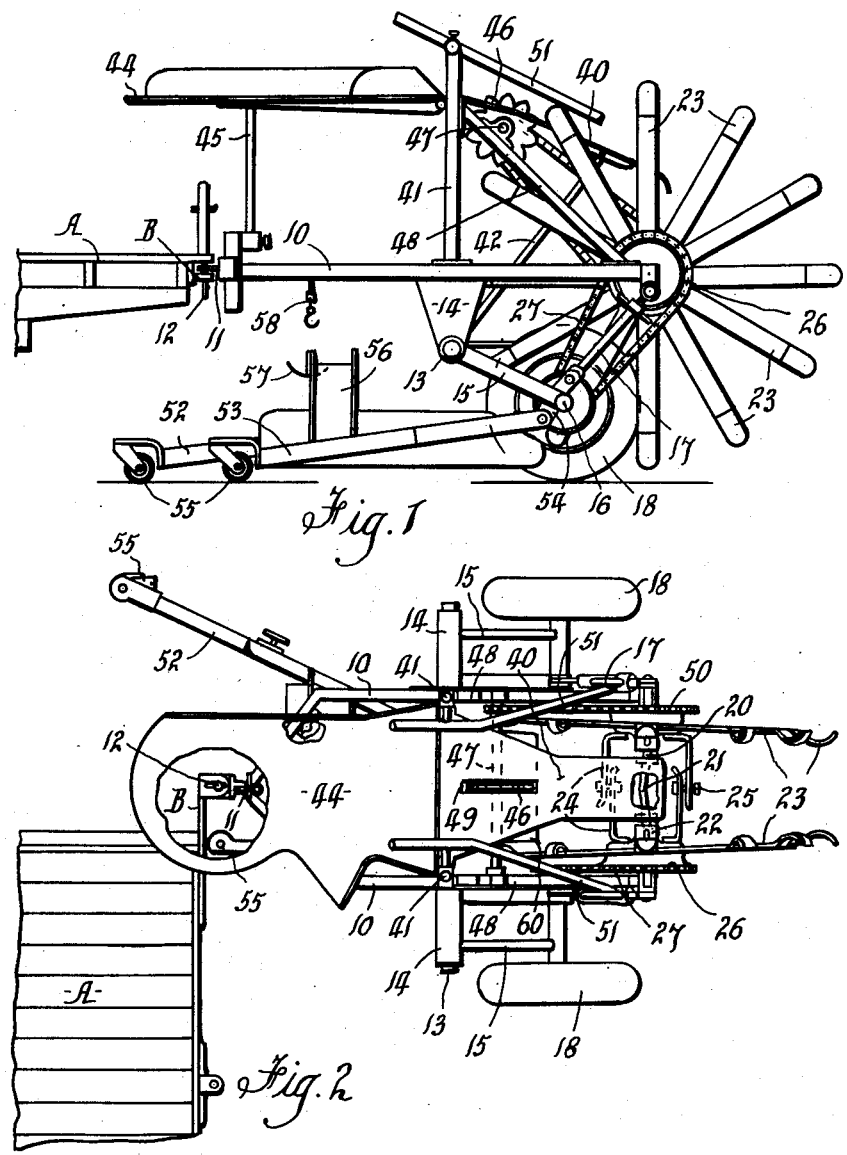
Inventor
C. W. MAXWELL
By Young, Emery & Thompson
Attys.

July 21, 1953  C. W. MAXWELL  2,646,181
BALE LOADING ATTACHMENT FOR VEHICLES
Filed July 7, 1950  2 Sheets-Sheet 2
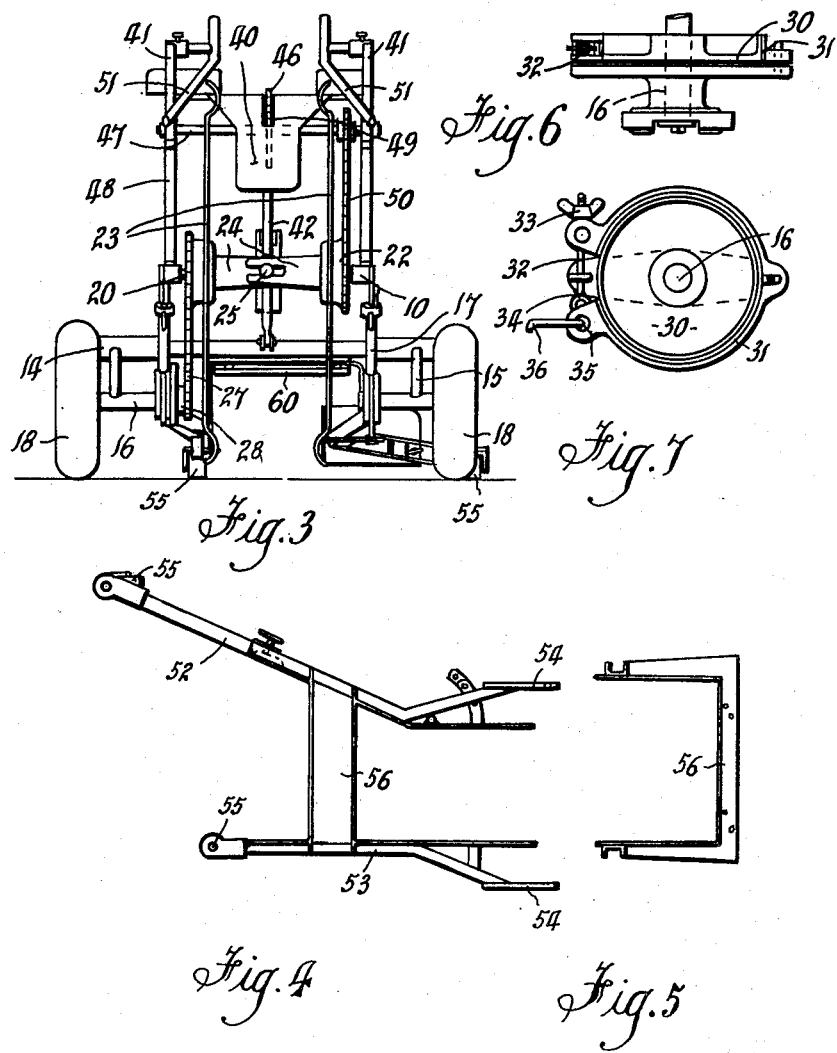
Inventor
C. W. MAXWELL
By Young, Emery & Thompson
Attys.

Patented July 21, 1953

2,646,181

UNITED STATES PATENT OFFICE 2,646,181

BALE LOADING ATTACHMENT FOR VEHICLES

Charles W. Maxwell, Okato, Taranaki, New Zealand

Application July 7, 1950, Serial No. 172,402 In New Zealand July 21, 1949

3 Claims. (Cl. 214—355)

This invention relates to means for attachment to any vehicle body for the purpose of providing that while the vehicle is travelling, bales of hay or the like, such as sacks of produce, left lying loosely on the ground lying to the side of the track of the vehicle, may be automatically engaged and lifted and then deposited upon an elevated platform positioned alongside the vehicle for ready and easy transfer therefrom into the vehicle body.

The invention comprises the combination with any approved form of vehicle, of means comprising two sets of radiating arms disposed alongside the vehicle body by being mounted side by side a distance apart upon a spindle extending laterally with such body with the two sets so relatively arranged that each arm of one set forms a pair with an arm of the other set. These arms are caused to rotate in synchronism through the travel of the said means, and in a vertical plane parallel with the line of their travel. The spindle upon which the two sets of arms are mounted is given a slight bend in its longitudinal line at a point between the two sets of arms so that as the arms are rotated those of each pair converge during the lower portion of the rotation and diverge during the upper portion. This action of these arms is employed in this invention to cause the pairs of the arms as they pass through the lower portion of their rotation during the travel of the vehicle, to close in upon bales or the like lying in the line of travel and grip them between them and then as they pass rearwardly to lift such bales between them, and to open out from one another to release the bales as the arms pass forwardly across the top of their movement.

A fixed platform is provided to receive the bales as they are released from the arms, such platform being disposed to extend along the line of the vehicle's side, above the level of the floor thereof. The transfer of the bales into the vehicle from this platform is easily and readily carried out.

Also means are provided to precede the said gripping and lifting sets of arms for the purpose of engaging the bales lying on the ground and to position them in a condition to be gripped and raised and to guide them to such lifting means.

The invention is particularly useful in respect of hay making and baling operations in which a travelling hay baler is employed to bale the cut hay and the bales are dropped upon the ground as the baler travels along and have to be gathered and transported. It is also useful in carrying out harvesting operations concerned with other products in which they are baled or placed in sacks for collection in the same manner. In this specification "bales" are referred to and this term is intended to comprehend sacks, bundles or like articles.

The invention is preferably given effect to by mounting the aforesaid attachment upon a separate wheeled chassis forming frame, and attaching it to the vehicle concerned as a trailer, tracking to one side of the line of the vehicle's travel to position the said receiving platform alongside the rear end of the vehicle body. The invention may, however, also be given effect to by directly associating the attachment with the vehicle by means of an outrigger frame upon one side thereof. The novel characteristics embodied in the invention are the same in both instances.

In the full description of these means they will be hereinafter described in relation to their embodiment in the form adapted for trailing attachment to the vehicle concerned and capable of detachment at will so that the vehicle may be used for other general purposes.

The invention is illustrated in the accompanying drawings, in which:

Figure 1 is a side elevation,

Figure 2 is a plan, showing parts broken away, and

Figure 3 is a rear elevation of the invention.

Figure 4 is a detail plan of the guiding means for guiding the bales into the lifting members.

Figure 5 is an elevation of a bridge combined in the said guiding means.

Figure 6 is a plan, and

Figure 7 is a side elevation of a clutch for use in operating the lifting means.

In the drawings the hauling and bale receiving vehicle as to such portion of its body as is concerned with the explanation of the invention, is shown at A and for its use therewith one of the rear corners of the body has a coupling bracket B affixed to project rearwardly. A similar bracket B' is affixed at about the centre of such rear.

The former bracket is used for the operative trailing of the bale collecting and delivery means while the latter bracket for the idle trailing of such means.

The said means comprise a chassis frame comprising two longitudinal side beams 10 spaced the requisite distance apart and extended at their forward ends to converge to a coupling point 11 adapted to be coupled to either of the vehicle brackets B or B' by means of a vertical pin 12 on which the chassis frame may swing. Near the rear end of the frame a main axle 13 is arranged to extend between the side beams 10 which axle is journalled in depending brackets 14 fixed to the respective beams. An arm 15 is fixed to each end of the axle to extend rearwardly and downwardly and in a sleeve upon the lower end of such arm a stub axle 16 is journalled. The said lower end is connected by the brace 17 adjustable in its length, with the rear end of the beam 10. On the said stub axle 16 a running wheel 18 is mounted so that with the corresponding wheel upon the other side, the chassis frame is mounted to be drawn over the ground surface when its forward end is coupled to the vehicle A. By the adjustment of the lengths of these braces the level of the wheels in relation to the chassis may be adjusted at will the lower ends of the arms 15 in which the wheels are mounted being raised or lowered by turning on the main axle 13. The near side wheel is removed in the showing of the machine in Figure 1.

A spindle 20 is provided to extend across between the rear ends of the beams 10 such spindle being fixed in position and also being formed with a bend, as at 21 in Figure 2, at its middle so that its two parts are out of alignment longitudinally to a desired extent. On each end of the said spindle, inside the beam on that side, a hub 22 is loosely mounted so that it may rotate freely. To each of these hubs a number of flat sectional arms 23 are fixed to radiate at distances, apart, such arms being of equal length and preferably being inwardly curved, as shown, at their outer ends. Also the arms are preferably made of spring steel. The two sets of arms thus provided are spaced a distance apart on the spindle and locked in rotative engagement one with the other, by means of the coupling plates 24 fastened to the inside of each hub 22 and extending into the middle and overlapping with the ends of the plates on the other hub. The overlapping ends are then slidably connected together by means of the bolts 25 extending through slots formed longitudinally in the said ends.

In the rotation of the two sets of arms therefore, by reason of the hubs being mounted on the respective ends of the bent spindle, the respective sets of arms will rotate in a vertical plane at right angles with the lines of the shaft ends on which they are carried. This will cause the two sets of arms at their outer ends to converge towards one another during one portion of the rotation and to move apart during the other portion. In the setting of the spindle 20 its bend 21 is disposed to provide that the arms in their rotation in the direction of the forward travel of the chassis will close together as they pass through the lower portion of their movement and will open out as they pass through the upper portion of such movement. The arms of the one set are disposed laterally opposite the respective arms of the other set so that a number of pairs of arms are provided by the two sets, such pairs moving in synchronization.

Thus these arms are adapted when they are rotated and moved to position a bale between them, to close on such bale as they move in the lower half of the rotation and to grip it between them and carry it rearwardly and upwardly and then as they reach the top, to open from the bale and release it. The spacing apart of the two sets of arms will naturally be so arranged as to adapt them for use in this manner in respect of bales of the size, or approximate size, to be dealt with.

Rotation is conveyed to the said sets of arms by the travel of the carrying chassis frame and by means of chain sprocket gearing between the hub 22 of one set and the stub axle 16 on the same side of the chassis. For this purpose a sprocket wheel 26 is fixed to such hub which is connected by the driving chain 27 with a sprocket wheel 28 mounted loosely on the stub axle. This latter sprocket is designed to be clutched to or declutched from the said axle and its running wheel by means of any approved clutch mechanism. The rotation of the lifting sets of arms may thus be controlled to start and to be stopped at will through the operation of these means.

In the drawings a suitable form of clutching means is shown at Figures 6 and 7 such means comprising the combination with the sprocket of a drum 30 fixed upon the axle, of an expanding and contracting band 31 attached to the sprocket and encircling such drum which band has its ends tensioned by means of the bolt 32 connecting its ends having the adjusting thumb nut 33. The said bolt is articulated at one of its ends to the corresponding band end by means of the link 34 mounted on an eccentric pin 35 in such end which pin has a handle 36 at one end which by being turned in the end will expand or contract the band. The band is so tensioned that when closed to transmit the drive it may slip should any obstruction be encountered in the travel of the rotating arms when in operation, thus obviating any liability of damage to the mechanism.

A receiving platform 40 on to which the bales, when released from the lifting arms, are delivered, is positioned between the two sets of arms to extend rearwardly from supporting pillars 41 fixed to the chassis beams 10, at a downward incline with the lower rear end supported upon a stay rod 42 fastened to the main axle 13 of the chassis frame. This platform is fixed at a level such that its rear end is well below the outer ends of the lifting arms as they pass through the upper portion of their rotation. Combining with this platform is an extension platform 44 extending forwardly from the forward edge thereof and pivotally supported upon the pillars 41 at its rear end and at its forward end carried upon a medially disposed rod 45 extending up from the coupling forward end 11 of the chassis frame. This rod is adjustable vertically so that the platform extension 44 may have the level of its forward end adjusted to any height desired for its purposes in conjunction with the drawing truck A. This extension platform leads forward to overlap the rear end of the truck in order that bales moved along it may be removed and deposited in the truck. Portions of the platforms 40 and 44 are shown broken away in Figure 2 in order to show certain parts of the machine beneath.

In order to aid the movement of the bales up the platform 40 and on to the extension 44 as such bales are released on to such platform, a wheel 46 having a serrated edge is provided and fixed upon a spindle 47 which is journalled in bearings upon strut members 48 of the chassis frame so that the spindle extends across beneath the forward end of the platform. The wheel at its upper part projects through a slot 49 formed in the platform so that the wheel edge is a distance above the platform surface. The spindle 47 is connected by chain and sprocket gearing 50 with the hub 22 on the reverse side of the machine to that concerned with the rotation of the arms 23 and this gearing causes the wheel 46 to rotate in a forward direction as to its upper part so that bales as they are released on to the platform, will be engaged by the serrated wheel edge and carried up the platform in the desired manner. Guide rods 51 are provided to extend rearwardly one from the top of each pillar 41 along the respective side edges of the platform to engage and centre the bales as they are moved upward. These guide rods are also so mounted in the pillars that their width apart may be adjusted.

Means are also provided for combination with these lifting and delivering means whereby bales lying on the ground in the path of the machine's travel, may be engaged or collected and then arranged in the correct position to be engaged and gripped by the lifting arms. For this purpose a collecting frame which is illustrated in full detail plan in Figures 4 and 5, is provided. This frame comprises two side arms 52—53 which are hinged respectively at their rear ends to brackets 54 (Figure 1) attached to the stub axles 16 on the respective sides of the machine and then extend forwardly beneath the chassis to be supported at their forward ends by castor wheels 55 engaging the ground surface. The two arms at their forward ends are bridged by a bridging cross member 56 (shown in Figure 5) which is made of such a height that it may pass freely over bales lying on the ground. Also such member may be provided with a deflecting curved plate 57 upon its forward edge which, if an engaged bale should be tipped upward, will engage and lower such bale flat upon the ground. One of these arms 53 extends on the inside parallel with the chassis while the outer arm 52 extends at an angle diverging laterally out from the arm 53 and for a distance beyond the end of such arm 53. This outer arm 52 is made with the forward portion separable from the main portion so that it may be removed and replaced at will, its removal being desirable when the machine is being towed idly behind the truck through connection to the coupling B' and in order that it will not project beyond the truck side. Also when being so towed the guide frame may be raised free of the ground by lifting its forward end and suspending it from the chassis by means of the chain 58 hanging from the chassis and hooked into the bridging member 56.

Provision may be made whereby on the backing of the chassis any bale then engaged by the gripping arms will be freed as such arms move forward and upwardly as caused by such backing. For effecting this a flat plate 60 (Figures 2 and 3) has its forward edge fixed beneath the main axle 13 and then extends rearwardly between the two sets of arms a distance such as to engage a bale so lifted and to force it free of the arms and cause it to drop back on to the ground.

Having now described my invention what I claim is:

1. Bale loading attachment for vehicles, comprising a chassis frame adapted to be attached at its forward end to a vehicle and mounted at its rear end upon running wheels, a spindle fixed in the rear of the chassis frame to extend transversely thereacross and bent in its longitudinal line to cause its two ends to extend in angular relationship with each other, a hub mounted loosely upon each spindle end, a set of arms fixed to extend radially at intervals apart from each of the said hubs, said arms being of a length to clear the ground when the hubs to which they are fixed are rotated, means for flexibly locking the two hubs in rotative engagement with each other so that those of one hub are respectively disposed opposite to those of the other hub, driving connection between one of the said hubs and one of the rear running wheels of the chassis, a platform supported upon the chassis at a distance above the said spindle disposed between the two sets of arms as they move in the upper portion of their rotation and means for rotatably connecting the two said hubs together which means comprise a coupling plate fastened to the inside of each hub and arranged to extend in and to overlap at its end with the inner end of the plate of the other hub, each of said plates being formed with a longitudinally extending slot at its inner end and a bolt passing through the slots of the two plates.

2. In a bale loading attachment of the class described, the combination with a vehicle, of a chassis supporting platform mounted on runner wheels, a spindle fixed to extend transversely in the chassis rearward of its platform, said spindle being bent at the middle in its longitudinal axis to cause its two ends to extend in angular relationship with each other, a hub mounted loosely on each spindle end and having a set of arms extending radially at intervals apart, said arms being of such a length to clear the ground on rotation, means for flexibly locking the hubs in rotative engagement with each other so that the arms of one hub are respectively disposed to the arms of the other hub in a working relationship across the end of the chassis platform, driving connection between one of the hubs and one of the running wheels of the chassis, a pair of guide arms disposed to extend forwardly from the respective sides of the chassis with their rear ends pivoted to the chassis a distance apart to that of the set of arms, castor wheels journalled in the front ends for engaging the ground, and a serrated wheel centrally mounted adjacent to the platform and coupled to the bent spindle of the two sets of arms.

3. In a bale loading attachment of the class described, the combination with a vehicle, of a chassis supporting platform mounted on runner wheels, a spindle fixed to extend transversely in the chassis rearward of its platform, said spindle being bent at its middle in its longitudinal axis to cause its two ends to extend in angular relationship with each other, a hub mounted loosely on each spindle end and having a set of arms extending radially at intervals apart, said arms being of such a length to clear the ground on rotation, a coupling plate fastened to the inside of each hub and arranged to extend in and to overlap at its end with the inner end of the plate of the other hub, each plate formed with a longitudinal slot at its inner end and a bolt passing through the slots of the two plates to provide a flexible rotative engagement of aligning arms whereby the lower portion of their rotation on the bent spindle converge toward each other and in the upper portion diverge from each other in relation to the rear end of the chassis platform, driving connection between one of the hubs and one of the running wheels of the chassis, a pair of guide arms disposed to extend longitudinally and forwardly from the respective sides of the chassis with their rear ends pivoted to the chassis at a distance apart to that of the sets of arms and their front ends diverging from each other with a castor wheel journalled in each end, the platform being formed with a slot, and a serrated wheel under rotative connection with the bent spindle for its upper edge to project through said last-mentioned slot.

CHARLES W. MAXWELL.

References Cited in the file of this patent

UNITED STATES PATENTS

| Number | Name | Date |
|---|---|---|
| 1,570,256 | Hunt | Jan. 19, 1926 |
| 1,853,253 | Bennett | Apr. 12, 1932 |
| 2,130,057 | Bennett et al. | Sept. 13, 1938 |
| 2,182,838 | Bennett | Dec. 12, 1939 |
| 2,367,970 | Smoker | Jan. 23, 1945 |
| 2,402,465 | Templeton | June 18, 1946 |